(12) United States Patent
Liu et al.

(10) Patent No.: US 7,457,898 B2
(45) Date of Patent: Nov. 25, 2008

(54) SUBSTITUTE SATA HOST FOR COMMUNICATING WITH A SATA DEVICE

(75) Inventors: Chuan Liu, Hsin-Chu (TW); Pao-Ching Tseng, Hsinchu County (TW); Po-Ching Lu, Tai-Chung (TW)

(73) Assignee: Media Tek Inc., Hsin-Chu Hsien (TW)

( * ) Notice: Subject to any disclaimer, the term of this patent is extended or adjusted under 35 U.S.C. 154(b) by 253 days.

(21) Appl. No.: 11/277,225

(22) Filed: Mar. 22, 2006

(65) Prior Publication Data

US 2007/0226385 A1    Sep. 27, 2007

(51) Int. Cl.
*G06F 13/12* (2006.01)
(52) U.S. Cl. .............................. 710/74; 710/11; 710/17; 710/62

(58) Field of Classification Search ................. None
See application file for complete search history.

(56) References Cited

U.S. PATENT DOCUMENTS

| 6,895,447 | B2* | 5/2005 | Brewer et al. ................. 710/11 |
| 6,917,992 | B2* | 7/2005 | Grimsrud et al. .............. 710/74 |
| 2006/0095630 | A1* | 5/2006 | Bashford et al. ............. 710/305 |
| 2007/0189172 | A1* | 8/2007 | Vedanabhatla et al. ...... 370/241 |
| 2007/0223517 | A1* | 9/2007 | Warren et al. ................ 370/463 |

* cited by examiner

*Primary Examiner*—Eron J Sorrell
(74) *Attorney, Agent, or Firm*—Winston Hsu

(57) ABSTRACT

A substitute serial advanced technology attachment (SATA) host is provided to communicate with a SATA device for facilitating communication with the SATA device even when a status flag of the SATA device indicates that the SATA device is busy. The SATA host is thereby able to communicate with the SATA device even when the SATA device is not fully functional.

24 Claims, 4 Drawing Sheets

SUBSTITUTE SATA HOST FOR COMMUNICATING WITH A SATA DEVICE

BACKGROUND

The invention relates to serial advanced technology attachment (SATA) devices, and more particularly, to a substitute SATA host and related method for communicating with a SATA device.

In the SATA protocol, a SATA host and a SATA device utilize Shadow Register Block registers to communicate with each other. The Shadow Register Block registers are registers used for delivering commands from the host to the device or for the device to inform the host of its current status. The host and the device exchange information through Frame Information Structures (FIS). Each FIS is composed of a group of Dwords, and the Dwords convey information between the host and the device.

According to the SATA specification, the host is restricted in the commands that it can send to the device until the reception of a good status or bad status indication from the device for clearing either the busy flag BSY or the data request flag DRQ of the device in the Shadow Register Block. Unless both of these flags have been cleared, the host can only send a device reset command or a software reset command to the device. Unfortunately, this means that the device is not able to receive other commands or data from the host until both the busy flag BSY and the data request flag DRQ have been cleared.

Typically, the host and the device transmit a series of Out of Band (OOB) signals for commencing communication between the host and the device. The device will then send a good status indicator to the host, which also has the effect of clearing the busy flag BSY and the data request flag DRQ. After this, normal communication between the host and the device can begin, with a series of FIS packets being exchanged between them.

One problem with the above situation is that the host is only able to send data to the device if the device has the proper firmware installed, and is capable of completing the OOB sequence and sending the good status indicator to the host. During mass production of SATA devices, the SATA devices do not originally have firmware written in their memories, such as flash memory. Therefore, when the host tries to write firmware to the flash memory of the device, the device is not able to complete the OOB sequence or submit the good status indicator to the host. Because of this, communication cannot begin between the host and the device, and the host is not able to write the firmware into the device's flash memory. In addition, there are other tasks that cannot be done if the device is not fully setup and does not have the firmware installed. For example, the device cannot perform a self-diagnostic, and therefore cannot send the good status indicator to the host.

SUMMARY

Methods and a substitute serial advanced technology attachment (SATA) host for communicating with a SATA device are provided. An exemplary embodiment of a method of communicating with a SATA device by using a substitute SATA host comprises establishing a physical layer connection between the SATA device and the substitute SATA host; the substitute SATA host transmitting commands and data to the SATA device when a busy flag of the SATA device is set (BSY=1); and the SATA device communicating with the substitute SATA host in response to receiving the commands and data.

An exemplary embodiment of a substitute SATA host for communicating with a SATA device is disclosed. The substitute SATA host comprises a physical layer for communicating with a physical layer of the SATA device; a transmitter for transmitting commands and data to the SATA device when a busy flag of the SATA device is set (BSY=1); and a receiver for receiving communication from the SATA device in response to the SATA device receiving the transmitted commands and data.

An exemplary embodiment of a method for a host to communicate with a serial advanced technology attachment (SATA) device by using a substitute protocol is disclosed. The method includes establishing a physical layer connection between the SATA device and the host; triggering the substitute protocol to become activated for substituting for the SATA protocol; and transmitting commands and data to the SATA device via the substitute protocol when a predetermined flag of the SATA device is set to be 1.

An exemplary embodiment of a host for communicating with a serial advanced technology attachment (SATA) device by using a substitute protocol is disclosed. The host includes a physical layer for communicating with a physical layer of the SATA device; a trigger input for receiving triggering signals which trigger the substitute protocol to become activated for substituting for the SATA protocol; and a transmitter for transmitting commands and data to the SATA device via the substitute protocol when a predetermined flag of the SATA device is set to be 1.

DETAILED DESCRIPTION

Figure 1:
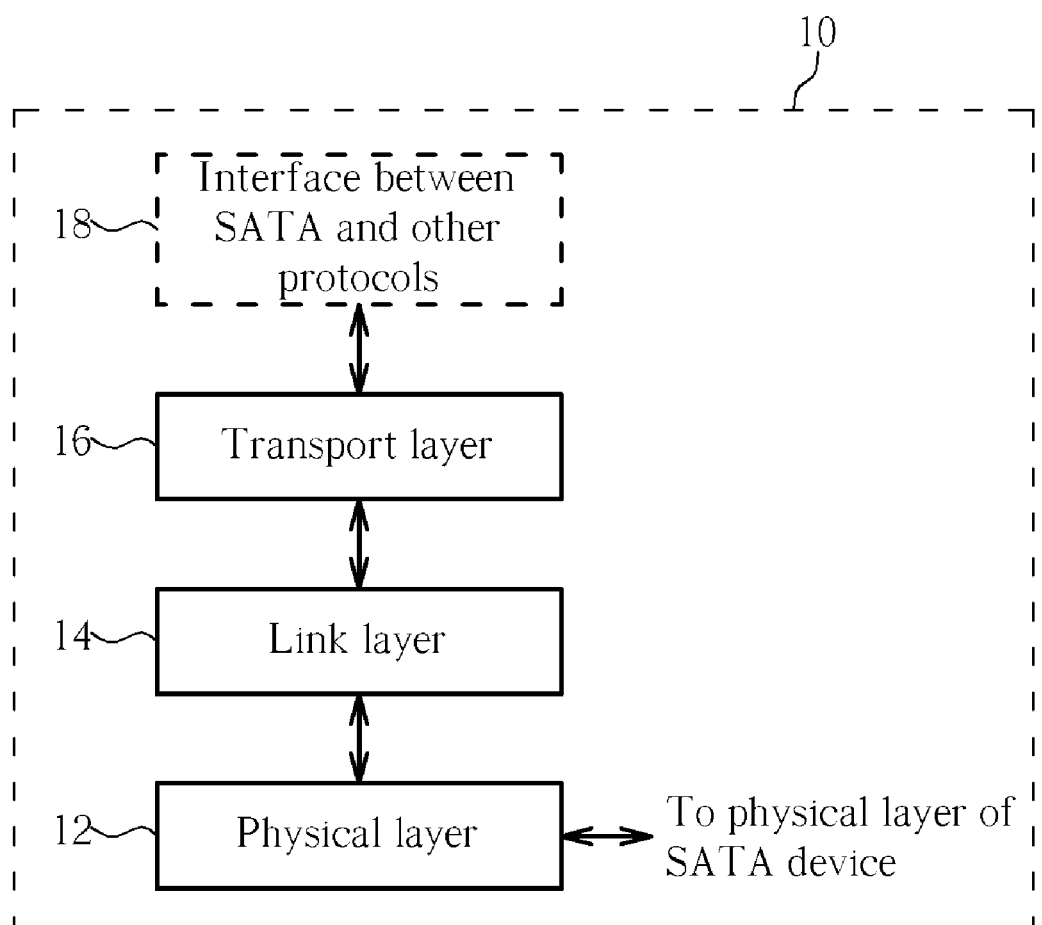
FIG. 1 is a diagram illustrating layers of a substitute SATA host according to a first embodiment.

A substitute SATA host is used to replace a regular SATA host in certain situations, such that the substitute SATA host is able to send commands and data to a SATA device when a regular SATA host would not be able to. Please refer to FIG. 1. FIG. 1 is a diagram illustrating layers of a substitute SATA host 10 according to a first embodiment. The substitute SATA host 10 comprises a plurality of layers, and includes the essential functions of a SATA physical layer 12, link layer 14, and transport layer 16. The substitute SATA host 10 can also include an optional interface 18 between the SATA protocol and other protocols. For instance, the interface 18 could be a SATA to RS-232 serial protocol interface, or other protocols like a USB protocol, an IEEE1394 protocol and a PCI-E/PCI-X protocol. The interface 18 can merely change the command layer to comply with the SATA specification. Furthermore, the host and the device can also use different protocols for other layers besides the command layer for communication, so long as the protocol is a serial protocol.

The substitute SATA host 10 does not require strict conformance to the SATA specification, and only requires the basic functionality of the physical layer 12, link layer 14, and transport layer 16. Once the physical layer 12 is connected to the physical layer of the SATA device, the substitute SATA host 10 can issue commands to the device, can send data to the device, or can receive data from the device. Therefore, the substitute SATA host 10 does not have the restriction of only sending commands or data to the SATA device when the both the busy flag BSY and the data request flag DRQ have been cleared. In this disclosure, the term physical layer can include all of the functions defined by the SATA specification, and can also include only the differential inputs defined by the SATA specification.

Figure 2:
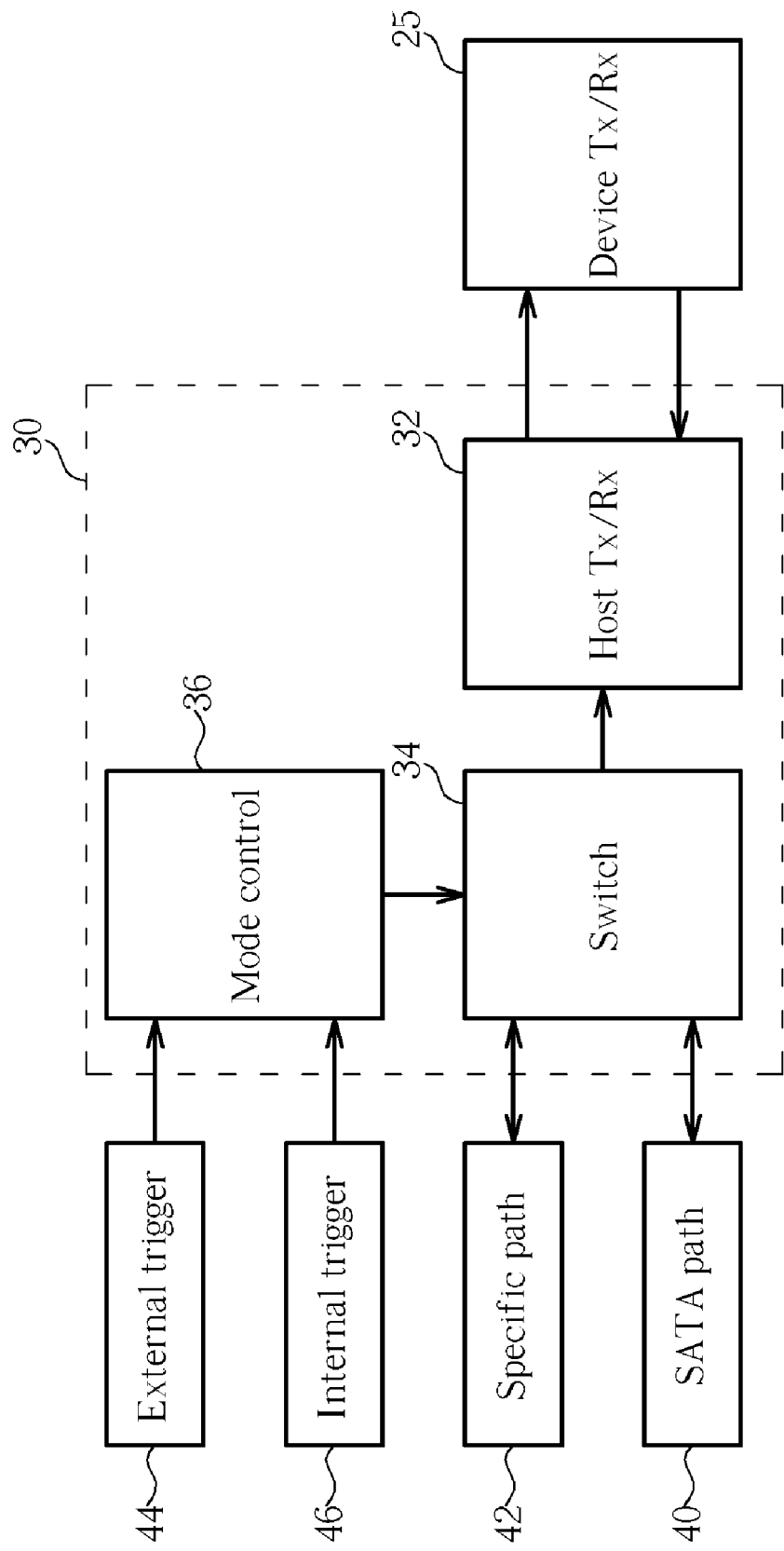
FIG. 2 illustrates a substitute SATA host according to a second embodiment.

Please refer to FIG. 2, which illustrates a substitute SATA host 30 according to a second embodiment. The substitute SATA host 30 comprises a transceiver 32 for transmitting commands and data to a transceiver 25 of the SATA device, and for receiving data from the transceiver 25 of the SATA device. In addition to communicating through the SATA protocol, the substitute SATA host 30 is also capable of switching to other communication protocols through the use of a mode control circuit 36 and a switch 34. The mode control circuit 36 receives input from either an external trigger 44 generated from outside of the substitute SATA host 30 or from an internal trigger 46 generated from inside the substitute SATA host 30. In response to the input received from the external trigger 44 or internal trigger 46, the mode control circuit 36 controls the switch 34 to switch the communication protocol used for the substitute SATA host 30 and the SATA device. For example, in FIG. 2, the protocol can be switched between a SATA path 40 and another specific path 42.

Figure 3:
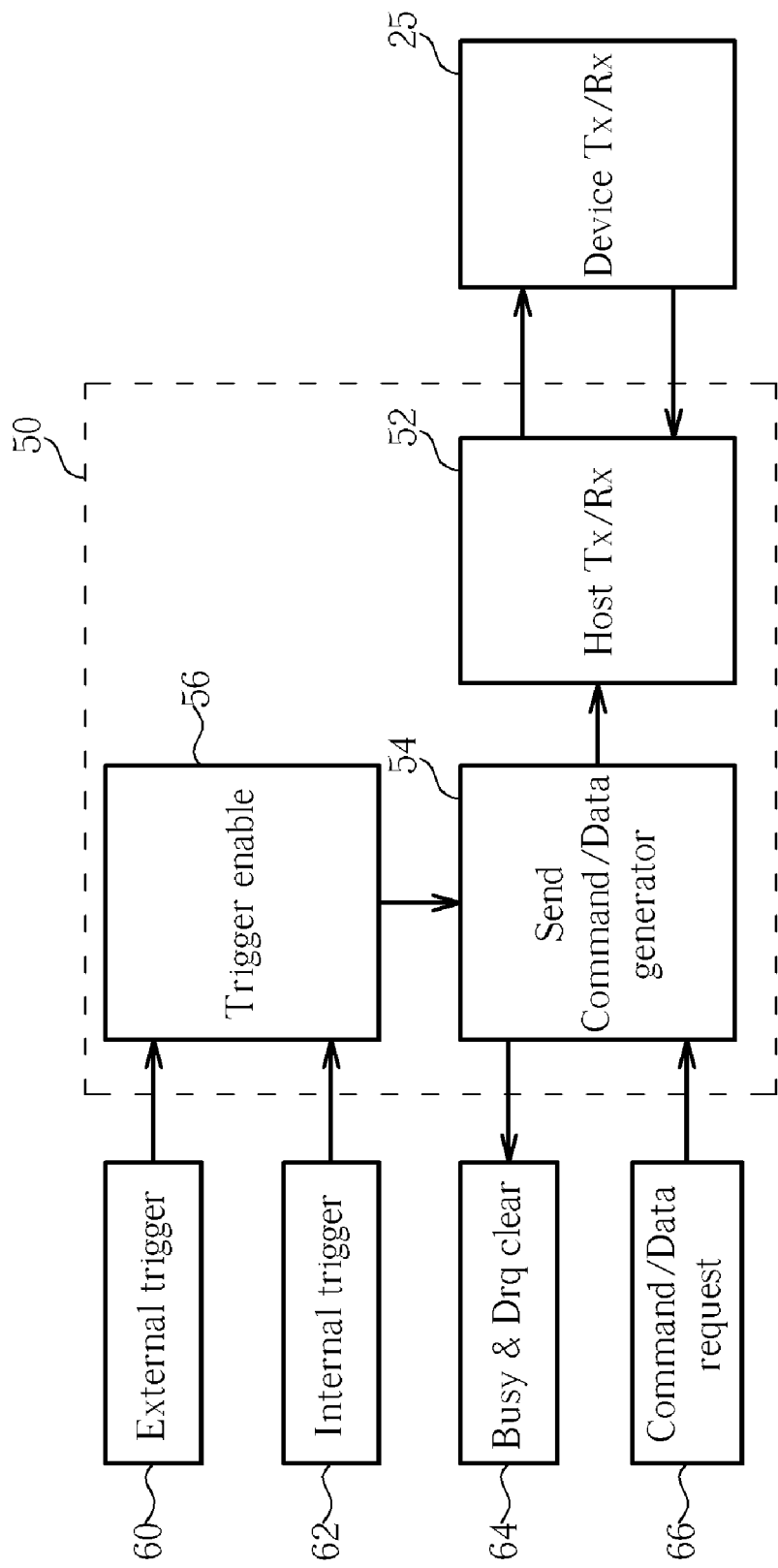
FIG. 3 illustrates a substitute SATA host according to a third embodiment.

Please refer to FIG. 3, which illustrates a substitute SATA host 50 according to a third embodiment. The substitute SATA host 50 comprises a transceiver 52 for transmitting commands and data to a transceiver 25 of the SATA device, and for receiving data from the transceiver 25 of the SATA device. The substitute SATA host 50 also comprises a send command/data generator 54 that is used to send commands or data to the transceiver 52 of the substitute SATA host 50 according to instructions from an external command/data request circuit 66. A trigger enable circuit 56 notifies the send command/data generator 54 when to receive commands or data from the command/data request circuit 66 and to transmit these commands or data to the transceiver 52 of the substitute SATA host 50. The trigger enable circuit 56 can be activated by an external trigger 60, an internal trigger 62, or a flag clear indicator 64 that indicates when both the busy flag BSY and the data request flag DRQ of the device are clear. When the external trigger 60 or the internal trigger 62 is activated, either the BSY and DRQ flags must already be cleared by SATA device or the substitute SATA host 50 must be capable of sending commands or data to the SATA device without these flags being clear, as was explained above. In any of the above cases, commands or data received from the command/data request circuit 66 are transmitted to the transceiver 52 of the substitute SATA host 50 via the send command/data generator 54. This setup provides a convenient way to control the substitute SATA host 50 to send commands or data to the SATA device.

Figure 4:
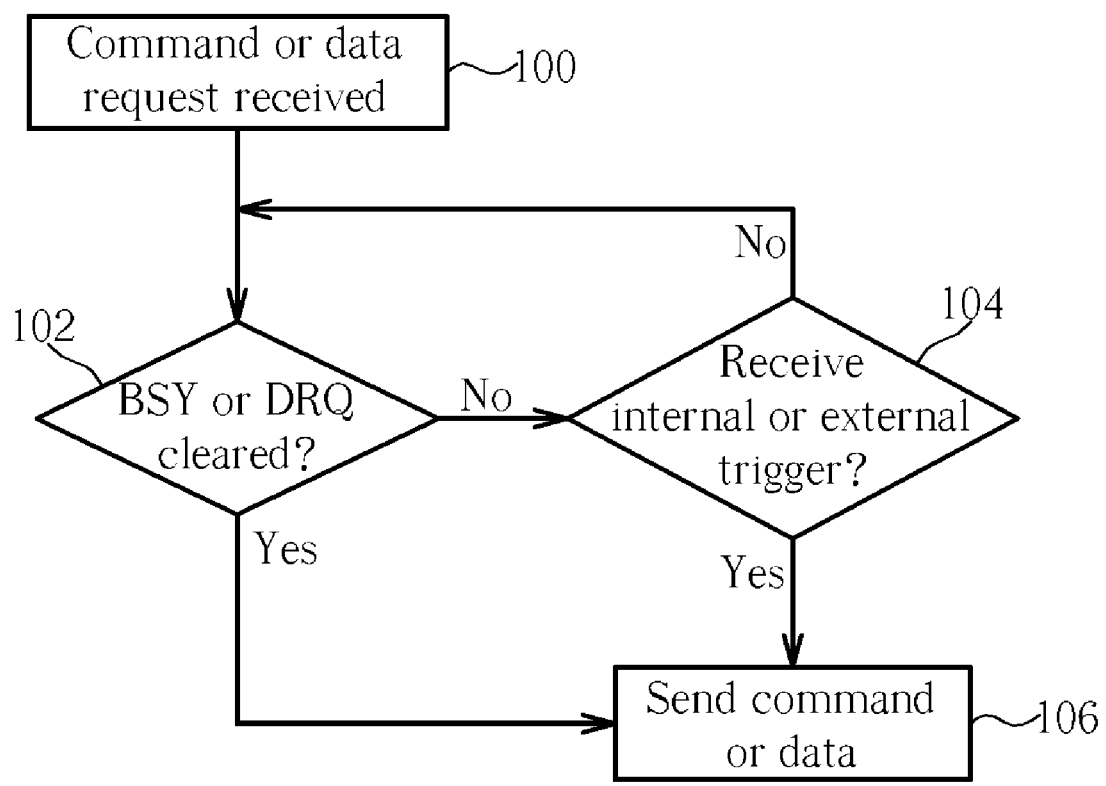
FIG. 4 is a flowchart illustrating sending commands or data to a SATA device.

Please refer to FIG. 4 with reference to FIG. 3. FIG. 4 is a flowchart illustrating sending commands or data to a SATA device. Steps contained in the flowchart will be explained below.

Step 100: A command or a data request is received through the command/data request circuit 66.

Step 102: Determine if both the BSY and DRQ flags of the SATA device are cleared. If so, go to step 106. If not, go to step 104.

Step 104: Determine if any internal or external trigger is received, indicating that the host supports sending commands or data to the SATA device without the BSY or DRQ flags being clear by the SATA device, and data is to be sent from the substitute SATA host 50 to the SATA device. If so, go to step 106. If not, go back to step 102.

Step 106: Since all conditions are satisfied for sending commands or data to the SATA device, the substitute SATA host 50 may now send the commands or data.

In summary, the substitute SATA host is capable of communicating with a SATA device even when the BSY and DRQ flags of the SATA device are not cleared. This provides a convenient way of updating a SATA device that is not fully functional. In addition, the communication protocol used between the substitute SATA host and the SATA device can be switched very easily, making the substitute SATA host a versatile multi-interface tool.

In another embodiment, the substitute SATA host may have USB to SATA bridge, IEEE1394 to SATA bridge, or PCI-E/PCI-X to SATA bridge. In USB bulk transaction protocol, the USB host can issue IN/OUT/PING token, and the device can response with ACK, NAK, NYET, STALL or no handshake return. The USB to SATA bridge can response with ACK to USB host and issues command to SATA device without busy bit is clear first. According to the above description, using similar approaches as USB to send command to SATA device in IEEE1394 to SATA bridge or PCI-E/PCI-X to SATA bridge can be easily implemented.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of communicating with a serial advanced technology attachment (SATA) device by using a substitute SATA host, the method comprising:
    establishing a physical layer connection between the SATA device and the substitute SATA host;
    the substitute SATA host transmitting commands and data to the SATA device when a busy flag of the SATA device is set (BSY=1); and
    the SATA device communicating with the substitute SATA host in response to receiving the commands and data.

2. The method of claim 1, further comprising the substitute SATA host transmitting commands and data to the SATA device when a data request flag of the SATA device is set (DRQ=1).

3. The method of claim 1, further comprising switching the communication protocol between the substitute SATA host and the SATA device from the SATA protocol to an alternate protocol in response to a received trigger signal.

4. The method of claim 3, wherein the received trigger is an external trigger generated from outside the substitute SATA host.

5. The method of claim 3, wherein the received trigger is an internal trigger generated from inside the substitute SATA host.

6. The method of claim 3, wherein the alternate protocol is select from the group consisted of a RS-232 serial protocol, a USB protocol, an IEEE1394 protocol and a PCI-E/PCI-X protocol.

7. A substitute serial advanced technology attachment (SATA) host for communicating with a SATA device, the substitute SATA host comprising:
    a physical layer for communicating with a physical layer of the SATA device;
    a transmitter for transmitting commands and data to the SATA device when a busy flag of the SATA device is set (BSY=1); and a receiver for receiving communication from the SATA device in response to the SATA device receiving the transmitted commands and data.

8. The substitute SATA host of claim 7, wherein the transmitter transmits commands and data to the SATA device when a data request flag of the SATA device is set (DRQ=1).

9. The substitute SATA host of claim 7, further comprising a switching circuit for switching the communication protocol between the substitute SATA host and the SATA device from the SATA protocol to an alternate protocol in response to a received trigger signal.

10. The substitute SATA host of claim 9, wherein the received trigger is an external trigger generated from outside the substitute SATA host.

11. The substitute SATA host of claim 9, wherein the received trigger is an internal trigger generated from inside the substitute SATA host.

12. The substitute SATA host of claim 9, wherein the alternate protocol is select from the group consisted of a RS-232 serial protocol, a USB protocol, an IEEE1394 protocol and a PCI-E/PCI-X protocol.

13. A method for a host to communicate with a serial advanced technology attachment (SATA) device by using a substitute protocol, the method comprising:
    establishing a physical layer connection between the SATA device and the host;
    triggering the substitute protocol to become activated for substituting for the SATA protocol; and
    transmitting commands and data to the SATA device via the substitute protocol when a predetermined flag of the SATA device is set to be 1.

14. The method of claim 13, wherein an external trigger generated from outside the host is used for triggering the substitute protocol to become activated.

15. The method of claim 13, wherein an internal trigger generated from inside the host is used for triggering the substitute protocol to become activated.

16. The method of claim 13, wherein the substitute protocol is select from the group consisted of a RS-232 serial protocol, a USB protocol, an IEEE1394 protocol and a PCI-E/PCI-X protocol.

17. The method of claim 13, wherein the predetermined flag is a busy flag.

18. The method of claim 13, wherein the predetermined flag is a data request flag.

19. A host for communicating with a serial advanced technology attachment (SATA) device by using a substitute protocol, the host comprising:
    a physical layer for communicating with a physical layer of the SATA device;
    a trigger input for receiving triggering signals which trigger the substitute protocol to become activated for substituting for the SATA protocol; and
    a transmitter for transmitting commands and data to the SATA device via the substitute protocol when a predetermined flag of the SATA device is set to be 1.

20. The host of claim 19, wherein the trigger input receives an external trigger generated from outside the host.

21. The host of claim 19, wherein the trigger input receives an internal trigger generated from inside the host.

22. The host of claim 19, wherein the substitute protocol is select from the group consisted of a RS-232 serial protocol, a USB protocol, an IEEE1394 protocol and a PCI-E/PCI-X protocol.

23. The host of claim 19, wherein the predetermined flag is a busy flag.

24. The host of claim 19, wherein the predetermined flag is a data request flag.

* * * * *